(12) United States Patent
Schrey et al.

(10) Patent No.: US 7,947,939 B2
(45) Date of Patent: May 24, 2011

(54) DETECTION OF OPTICAL RADIATION USING A PHOTODIODE STRUCTURE

(75) Inventors: Olaf Schrey, Ratingen (DE); Bedrich Hosticka, Muehlheim (DE); Werner Brockherde, Dulsburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 636 days.

(21) Appl. No.: 12/066,863

(22) PCT Filed: Sep. 15, 2005

(86) PCT No.: PCT/EP2005/009932
§ 371 (c)(1),
(2), (4) Date: May 6, 2008

(87) PCT Pub. No.: WO2007/031102
PCT Pub. Date: Mar. 22, 2007

(65) Prior Publication Data
US 2008/0258044 A1   Oct. 23, 2008

(51) Int. Cl.
*H01L 27/00* (2006.01)
(52) U.S. Cl. .......... 250/208.1; 250/559.22; 348/135; 348/230.1; 356/601
(58) Field of Classification Search .......... 250/208.1, 250/559.19–559.22; 348/135, 230.1; 356/601
See application file for complete search history.

(56) References Cited

U.S. PATENT DOCUMENTS

| | | | |
|---|---|---|---|
| 6,373,557 B1 | 4/2002 | Mengel et al. | |
| 6,839,084 B1 | 1/2005 | Hiyama et al. | |
| 6,927,889 B2 | 8/2005 | Schwarte | |
| 7,012,738 B1 | 3/2006 | Schwarte | |
| 7,489,352 B2 * | 2/2009 | Nakamura | 348/296 |
| 7,531,858 B2 * | 5/2009 | Lee | 257/292 |
| 2006/0131483 A1 | 6/2006 | Schrey et al. | |
| 2006/0146159 A1 * | 7/2006 | Farrier | 348/308 |
| 2008/0048100 A1 * | 2/2008 | Bamji et al. | 250/214 A |

OTHER PUBLICATIONS

Miyagawa et al.: "CCD-Based Range-Finding Sensor," IEEE Transactions on Electron Devices; vol. 44; No. 10; Oct. 1997; pp. 1648-1652.
English translation of the official communication issued in counterpart International Application No. PCT/EP/2005/009932, mailed on Jul. 17, 2008.

* cited by examiner

*Primary Examiner* — Georgia Y Epps
*Assistant Examiner* — Kevin Wyatt
(74) *Attorney, Agent, or Firm* — Keating & Bennett, LLP

(57) ABSTRACT

The central idea of the present invention is that a readout result of an optical detection unit which is based on accumulating photocharges can be improved when the charge carriers accumulated on a photodiode capacitance can be transferred to a readout capacitance before being read out by a readout unit, and when the state of the readout capacitance can be read out in a non-destructive manner by the readout unit, so that a noise portion in the readout signal can be corrected by reading out the readout capacitance during charge accumulation and again reading out the readout capacitance after the end of charge accumulation. Additionally, it becomes possible by the transfer to the readout capacitance to vary the sensitivity of the optical detection device within broad limits and to record a sequence of successive light pulses, without having to reset a photodiode before recording every single light pulse.

12 Claims, 9 Drawing Sheets

DETECTION OF OPTICAL RADIATION USING A PHOTODIODE STRUCTURE

TECHNICAL FIELD

The present invention relates to the detection of optical radiation and an optical receiving device as is exemplarily employed in 3D cameras.

BACKGROUND

There are various applications in which optical radiation is to be detected. An example of applications of this kind are 3D cameras. In this context, CMOS image sensorics offer the possibility of detecting depth by means of near infrared (NIR) light pulse propagation time methods in a non-tactile manner. The residual intensity of the laser light reflected by an object is measured here. Principally, there are two possible methods, pulse propagation time methods and methods including modulated light. In combination with very short exposure and/or shutter times or suitable demodulation signals, a measurement provides a residual quantity of the reflected light which is proportional to the distance of the object. 3D cameras are based on this principle.

Using CMOS technology, cameras including intelligent pixels which, except for standard imaging, exemplarily also determine or even track, using a tracking method, the presence of people using movement may be realized. CMOS cameras may even realize combinations of 2D and 3D imaging.

Using the method of 3D distance measurement by means of CMOS image sensors, three-dimensional image scenes can be processed electronically in real time. A multitude of applications result from this. Three-dimensional inspection and placement systems, for example, necessitate the highest possible degree of image information for reliable object recognition and classification, as is provided by the additional depth information of a 3D sensor. Further fields of application are in automotive systems, i.e. in the motor vehicle sector, for monitoring tasks, like, for example, monitoring the interior of a motor vehicle including intelligent airbag triggering, theft protection, lane recognition, accident and/or pre-crash recognition, methods for pedestrian protection and parking aids. Further fields of application include topography measurements, person recognition and presence sensorics. In particular in airbag control, the camera system for example has the task of providing reliable distance or spacing data, since the airbag has to be triggered by smaller a force depending on the distance of the passenger. This is possible using 3D-CMOS image sensors which provide depth information for every pixel.

FIG. 8 shows the basic structure of 3D measuring systems. An object 802 to be measured is irradiated with pulsed or modulated light 806 by a light source 804, the reflected light 808 being imaged on a pixel array 812, like, for example, a CMOS chip, by optics 810. Additionally, the system includes control means 814 which is coupled to the light source 804 and the pixel array 812 to control system operation when measuring.

In the case of a pulse method, the control means 814 for example drives the light source 804 such that the object 802 is irradiated by light pulses 806 which are synchronized in time with exposure slots of the pixel array 812. 3D-CMOS image sensors for distance and/or depth measurement here may exemplarily be based on the functional principle of an active pixel sensor in which the temporal opening of the exposure slot of a pixel is synchronized with the pulsed triggering of active scene illumination.

In the case of a modulation method, the control means 814 for example drives the light source 804 such that the object 802 is irradiated with modulated light 806, the received signal 808 being demodulated on the receiver side such that the phase difference between the transmitted signal and the reflected signal provides information on the distance.

The mode of functioning of the system of FIG. 8 when using pulsed irradiation under temporal synchronization of the exposure slots will be described exemplarily referring to FIG. 9. In FIG. 9, three graphs are shown, of which the top one shows the time wave form of the emitted light intensity of the light source 804, the time t being plotted in arbitrary units along the horizontal axis and the intensity in arbitrary units being plotted along the y axis. Below that, FIG. 9 shows two graphs representing a time wave form of the received light intensity at two different pixels, namely pixel 1 and pixel 2, of the pixel array 812, wherein again the time t is plotted along the x axis and the intensity is plotted along the y axis. As can be seen, the time range illustrated extends over two emitted light pulses 902 and 904. The exposure slots 906a, 906b and 908a and 908b are located in time synchronization to the light pulses 902 and 904, respectively, as is indicated in FIG. 9 by broken likes. As can also be seen from FIG. 9, the reflected light pulses 910a, 910b and 912a, 912b arrive at the pixels 1 and 2, respectively, at different times and/or with a different time offset $t_{D1}$ and $t_{D2}$, respectively, which depends on the distance of the respective object point to the optics 810 and the pixel array 812 imaged onto pixel 1 and pixel 2, respectively. Due to the different time offset and, in particular, due to the differently sized overlap between the respective exposure slots 906a-908b and the received reflected light pulse 910a-912b, different charge quantities $Q_1$ and $Q_2$ will result in the pixel structures of pixel 1 and pixel 2, respectively. In particular, the charge Q accumulated at every pixel is proportional to the distance r of the object point to the respective pixel, i.e. Q~r/2c, c designating the speed of light.

Different problems of different origins arise in the procedure according to FIG. 9. A portion of undesired background light will be detected in connection with the desired reflected light useful signal. Furthermore, the reflectivity of the scene objects influences the portion of the light reflected. These factors sometimes corrupt the useful signal considerably, depending on the distance of the object, and need to be removed by measuring the object scenery several times, like, for example, by an additional measurement extending the exposure time slot and additional imaging with no illumination pulses present. Combining these measuring results will then result in a 3D measuring result free from reflectivity and background light corruption, wherein reference is made, for example, here to WO 99/34235 A1 where a system according to FIG. 8 using a CMOS-CCD camera is described.

Another problem is that the propagation time of the pulsed and/or modulated light 806 is very short and exemplarily is in the range of nanoseconds, this also being the reason for the fact that the charge quantity Q containing the depth information is small so that the signal-to-noise ratio as results by evaluating a pulse is relatively great. One way of improving the signal-to-noise ratio is accumulating the charge quantities of successive pulses on the pixel structure of the corresponding pixel or in an external circuit to thereby obtain an improved signal-to-noise ratio by signal averaging.

In the pulse method, for example, this way of improving the signal-to-noise ratio is basically possible, however the pixel has to be reset after each pulse of the sequence. In FIG.

9, a reset process exemplarily takes place at the beginning of the exposure slots 906a-908b, the reset being when a charge quantity to be read out at the end of the exposure slot is set to a predetermined value. However, the reset process itself generates a noise contribution to a considerable degree which, in turn, corrupts or reduces the signal swing obtained by a multiple pulse sequence.

Since in industry there is great demand for precise 3D measuring systems, as has been described in the introduction, in industry there is also demand for an improved detection of electromagnetic radiation for reducing the negative influence caused by reset processes.

In "CCD-Based Range Finding Sensor", IEEE Transactions on Electronic Devices, Vol. 44, No. 10, Oct. 1997, pp. 1648-1652, a method for measuring distances by means of a CCD sensor is described. In this system, light pulses which, after reflection at the object, impinge on the photogate of a pixel are used. Below the photogate, photoelectrons are generated which, depending on the driving of two slot gates to one respective side of the photogate, are transferred to a first memory gate or a second memory gate. This alternating accumulation at the memory gates is performed over several periods.

WO 02/33817 A1 describes a method and a device for detecting and processing signal waves where every pixel has two photodiodes which are provided with a voltage alternatingly to demodulate modulated light signals in a manner phase-offset to each other. A similar procedure is described in WO 04/086087 A1.

SUMMARY

According to an embodiment, an optical detection device may include a photodiode structure having a photodiode capacitance for accumulating charge carriers responsive to electromagnetic radiation, a readout capacitance, resetting means for resetting the readout capacitance by providing the read-out capacitance with a predetermined voltage, switching means for connecting the photodiode structure to the readout capacitance to transfer the accumulated charge carriers onto the readout capacitance during a transfer phase and for separating the photodiode structure from the readout capacitance during an accumulation phase, readout means for reading out the readout capacitance, the readout means being implemented to read out the readout capacitance for a first time during the accumulation phase and a second time after the accumulation phase for obtaining a first and second readout value, and to combine the two values for obtaining a readout result, and an additional readout capacitance having respective addition resetting means for resetting the additional readout capacitance, and additional switching means for connecting the photodiode capacitance to the additional readout capacitance during an additional transfer phase.

According to another embodiment, a system for 3D measurements of objects may have: a pulsed light source; a plurality of devices mentioned above the detection means of which are arranged in a matrix, wherein the accumulation phase and the transfer phase are synchronized with a radiation phase by means of the switching means; imaging means for imaging an object onto the matrix; and evaluating means for generating 3D information concerning the object based on the states of the readout capacitances of the plurality of devices.

According to another embodiment, a method for operating an optical detection device including a photodiode structure having a photodiode capacitance for accumulating charge carriers responsive to electromagnetic radiation and a readout capacitance, and an additional readout capacitance, may have the steps of: resetting the readout capacitance by applying a predetermined voltage to the readout capacitance by means of resetting means; connecting the photodiode structure to the readout capacitance by switching means to transfer the accumulated charge carriers to the readout capacitance during a transfer phase and separate the photodiode structure from the readout capacitance during an accumulation phase; reading out the readout capacitance by readout means, the readout means being implemented to read out the readout capacitance for a first time during the accumulation phase and for a second time after the accumulation phase for obtaining a first and second readout values, and to combine the two values for obtaining a readout result; resetting the additional capacitance; connecting the photodiode structure to the additional readout capacitance by additional switching means to transfer the second accumulated charge carriers to the additional readout capacitance during a transfer phase and separate the photodiode structure from the additional readout capacitance during an accumulation phase; and reading out the additional readout capacitance to read out the additional readout capacitance for a first time during the accumulation phase and for a second time after the accumulation phase for obtaining a first and second readout values, and to combine the two value for obtaining an additional readout result.

An embodiment may have a computer program having a program code for performing the above mentioned method for detecting optical radiation, when the program runs on a computer.

The central idea of embodiments of the present invention is allowing a reduction in noise when a photodiode structure having a photodiode capacitance is assigned a readout capacitance which is separated from the photodiode structure by switching means, and when readout means is provided which, for obtaining a readout result, does not only read out a readout value from the readout capacitance after the accumulation phase but also once during the accumulation phase to combine the two readout values, like, for example, to calculate the difference, so that the reset noise forming when the readout capacitance is reset can be eliminated from the readout result or reduced.

According to an embodiment of the present invention, the photodiode structure is formed of a pinned photodiode the space charge zone of which can be depleted, which in particular entails the advantage that, in a pinned photodiode, the light-sensitive p-n junction is not covered by a metal electrode and is close to the surface so that a pinned photodiode has higher a sensitivity.

According to another embodiment of the present invention, the first readout of the first readout value takes place directly after resetting the readout capacitance, the second readout taking place after the end of the accumulation phase or in a subsequent transfer phase. The voltage state of the readout capacitance can for this purpose be read out at any time such that the state of the readout capacitance does not change during the readout process. Additionally, the read-out voltage state of the readout capacitance can be latched in an analog, but also in a digitalized way. The portion of the reset noise in the final readout result here is corrected by subtracting the two latched readout values from each other at the end of a complete readout cycle, so that the contribution of the reset noise in the final readout result is eliminated or at least reduced.

In another embodiment of the present invention, it becomes possible to record a sequence of several successive light pulses without having to trigger a reset event of the read capacitance after each light pulse. At the beginning of the charge accumulation of a first accumulation phase, the read-out capacitance is reset, and directly after that the state of the readout capacitance is read out for a first time and stored. After the end of the first charge accumulation phase, the accumulated charge is transferred from the photodiode to the readout capacitance. The photodiode can, without the readout capacitance having to be reset, start a new accumulation cycle, since its space charge zone has been restored by the depletion due to the charge transfer. At the end of the first accumulation cycle, a transfer of the photocharges onto the readout capacitance takes place again. This process may in principle be repeated as frequently as desired, wherein it should be kept in mind that the precharged readout capacitance is continued to be discharged with each charge transfer by the accumulated charge in the photodiode, so that the maximum number of accumulation phases to be recorded results from the magnitude of the readout capacitance and the reset potential. This is referred to as so-called full well capacity. At the end of the last accumulation phase, the voltage state of the readout capacitance is read out for a second time and also latched, the final readout result resulting from calculating the difference of the second readout result and the first readout result and, again, being free from a noise portion. An optical detection device operated in this way contributes to a significant improvement in the signal-to-noise ratio and can be realized using a standard CMOS structure. Several successive accumulation phases will be possible without having to trigger a reset event after each individual accumulation phase, which would deteriorate the signal-to-noise ratio again due to the unavoidable noise contribution.

According to another embodiment of the present invention, the contribution of the background light to the final readout result can be corrected efficiently, in addition to correcting the reset noise. This is made possible by the fact that the pinned photodiode can be connected in a random fashion to three readout capacitances, each readout capacitance containing its own reset means and its own readout device. Control means in this embodiment is to be extended in that it can connect the photodiode to any of the three readout capacitances at freely selectable times, and that the reset device and the readout device of each of the three readout capacitances can also be synchronized with emitting the light pulse of the pulsed light source.

A first accumulation phase begins after the light pulse has been emitted from the light source. After the end of the first accumulation phase, the generated photocharges of the first accumulation phase are transferred to the first readout capacitance by connecting the photodiode capacitance to the first readout capacitance, are read out and latched as a first readout result. During a second accumulation phase which is performed without active object illumination, the charge carriers generated on the photodiode are only generated by the background light present. At the end of the second accumulation cycle, the charge accumulation on the photodiode is transferred to the second readout capacitance and is subsequently read out, the second readout result obtained in this way containing a background light signal. The background light portion in the first readout result is, according to the embodiment, eliminated in an advantageous manner by subtracting the second readout result from the first readout result.

In another embodiment of the present invention, a first photodiode structure and a second photodiode structure are used for realizing a distance measuring method according to the modulation principle. The control means here additionally controls the modulation of the emitted light signal and, by means of a demodulation signal, the transfer times of the accumulated photocharges of the first photodiode to the first readout capacitance and the second photodiode to the second readout capacitance. The information on the phase difference and thus the distance information are contained in the different charge quantities which are read out at the times preset by the demodulation signal. In the embodiment a distance measuring method, which is based on the modulation method, is realized completely in a standard CMOS process, the light-sensitive regions not being covered partly by opaque structures like in the other conventional devices, thereby improving sensitivity and the signal-to-noise ratio.

BRIEF DESCRIPTION OF THE DRAWINGS

Embodiments of the present invention will be detailed subsequently referring to the appended drawings, in which.

DETAILED DESCRIPTION

Figure 1:
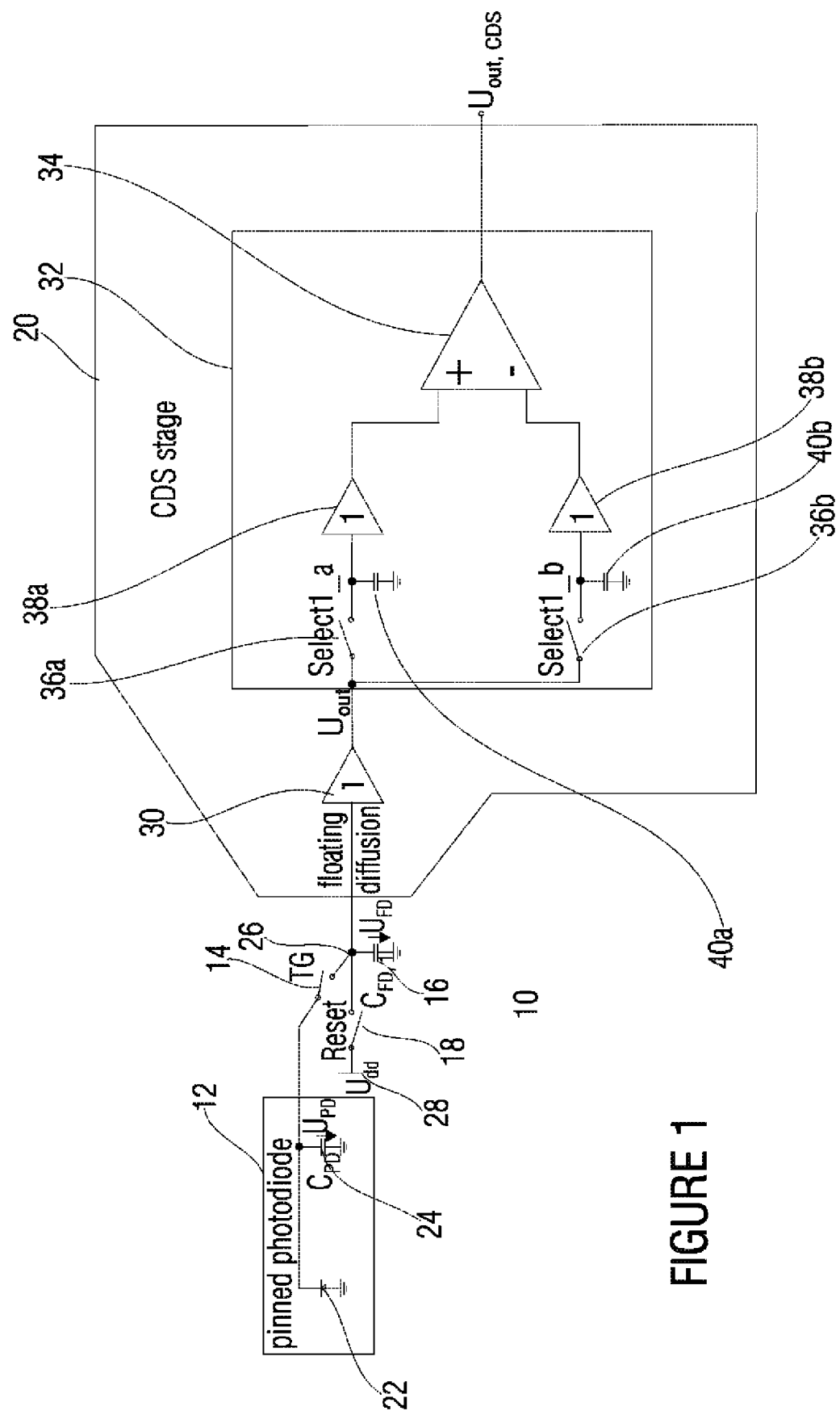
FIG. 1 is a circuit diagram of an optical detection device according to an embodiment of the present invention.

Before the present invention will be detailed subsequently referring to the drawings, it is pointed out that in the figures same elements are provided with same or similar reference numerals and that a repeated description of these elements is omitted.

Also, it is pointed out that, in the subsequent description of the figures, it is assumed that the optical detection devices shown are part of the system of FIG. 8, which is why reference is made partly to FIG. 8 and the elements thereof without describing the structure of FIG. 8 again. In particular, the optical detection devices described below may, for example, represent one single pixel of the pixel array 812, as will become clear from the subsequent description.

A first embodiment of an optical detection device will be described referring to FIGS. 1-3. FIG. 1 shows the structure of the optical detection device which in FIG. 1 is generally indicated by 10. The optical detection device 10 includes a pinned photodiode 12, a transfer switch 14, a readout capacitance 16, a reset switch 18 and a readout circuit 20. The pinned photodiode 12 includes two p-n junctions which in FIG. 1 are illustrated as a photodiode 22 and a photodiode capacitance 24. The photodiode 22 and the capacitance 24 are connected, in parallel to each other, between ground and the switch 14 which, in turn, is connected between the pinned photodiode 12 and a circuit node 26. The circuit node 26 is connected to the input of the readout circuit 20. The reset switch 18 is connected between the circuit node 26 and a supply voltage terminal 28 to which a supply voltage $U_{DD}$ is applied. The readout capacitance 16 is connected between ground and the circuit node 26.

The readout circuit 20 in turn includes a unity-gain amplifier 30 and a CDS (correlated double sampling) stage 32 which are connected in series between an input of the readout circuit 20 and an output of the readout circuit 20, the output of the readout circuit 20 at the same time representing an output of the optical detection device 10 where the readout result and/or readout voltage $U_{out,CDS}$ is output.

The CDS stage includes an output-side difference calculator 34, a series connection of a selection switch 36a and a unity-gain amplifier 38a and 36b, respectively, and 38b being connected between an input of the CDS stage and the positive and negative inputs of the difference calculator 34. A latch capacitance 40a and 40b is connected to ground at a circuit node between the selection switch 36a, b and an input of the unity-gain amplifier 38a, b.

Figure 2:
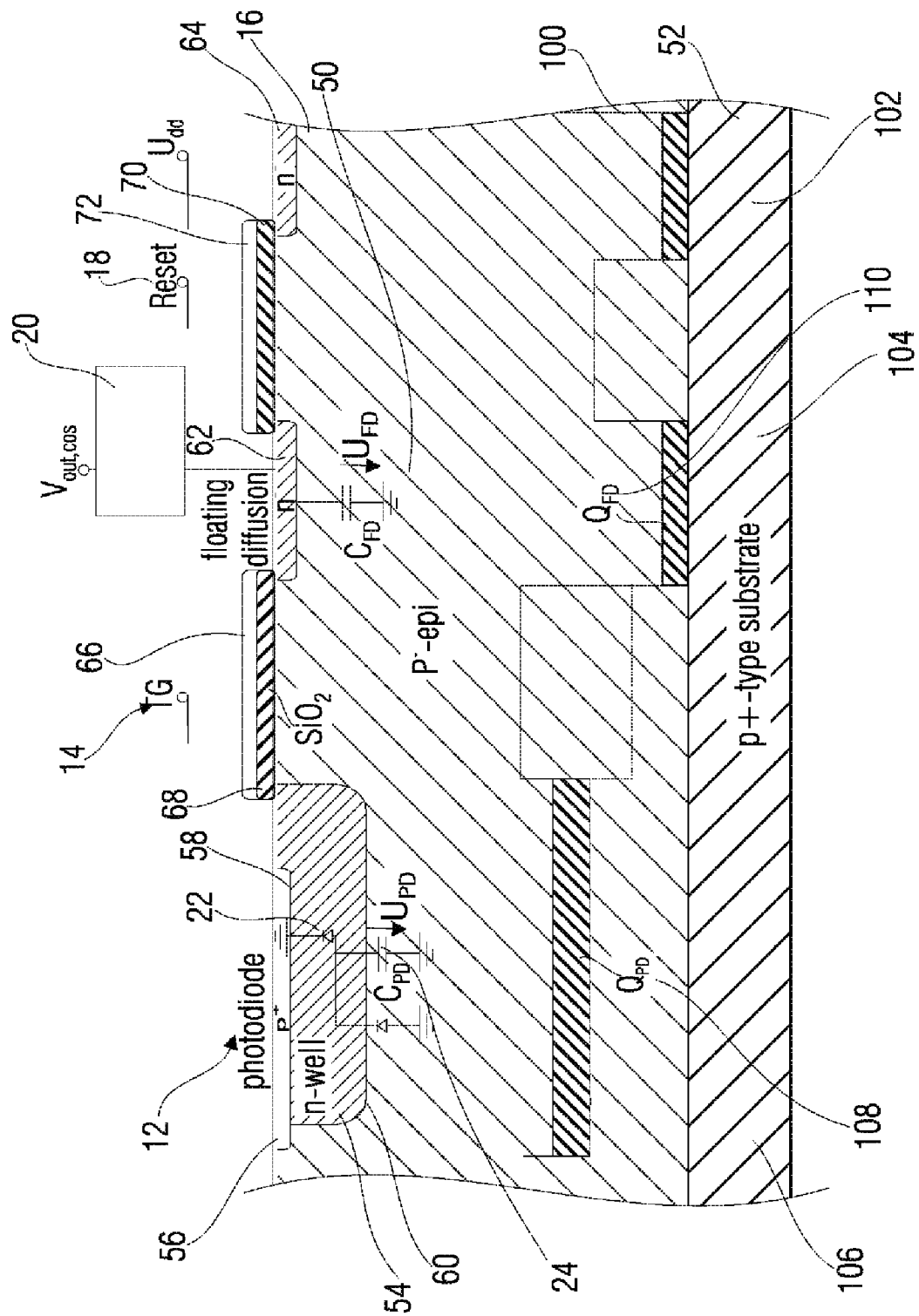
FIG. 2 is a semi-schematic cross-sectional drawing of a part of the device of FIG. 1.

FIG. 2 shows an embodiment of a possible implementation of the device of FIG. 1, the readout circuit 20 being only illustrated schematically as a block.

According to this implementation, the device of FIG. 1 is formed in a p⁻-epi layer or lightly doped epitaxial p-type layer 50 which is arranged on a p⁺-type or highly doped p-type substrate 52. As can be seen, the pinned photodiode 12 is formed of an n-doped well 54 in the layer 50 at the exposed side of which, in turn, a p⁺-doped region 56 is arranged so that a p-n junction 58 representing the photodiode 22 of FIG. 1 is formed in the proximity to the exposed surface. The p-n junction 60 between the n-well 54 and the p⁻-type layer 50 forms the photodiode capacitance 24, wherein, although not shown in FIG. 2, the substrate 52 and the layer 50 are connected to ground. On the exposed surface of the layer 50, two further n⁻-doped regions 62 and 64 are formed, wherein the first one mentioned, in combination with the n-well 54, forms a transistor or MOS transistor representing the switch 14 and additionally comprising a gate electrode 66 extending above the n-well 54 and the n⁻-type region 62 and between same and being separated from the n-well 54 and the n⁻-type region 62 by a silicon dioxide layer 68. Similarly, a layer arrangement of a silicon dioxide layer 70 and a gate electrode 72 extends between the n⁻-type region 62 and the n⁻-type region 64 to form a transistor or MOS transistor acting as a reset switch 18. As is shown in FIG. 2, the p-n junction between the n⁻-type region 62 and the p⁻-type layer 50 forms the readout capacitance 16.

As will be discussed below in greater detail referring to FIG. 3, it is made possible by suitably controlling the switches 14, 18, 36a and 36b to achieve, by means of the pinned photodiode 12, readout which is basically free from reset noise which occurs unavoidably when resetting the readout capacitance 16, as will be discussed in greater detail below. In particular, the switch 14 is controlled by a control signal TG applied to the gate electrode 66, the reset switch 18 controlled by a reset signal Reset applied to the gate electrode 72, the selection switch 36a controlled by a signal Select1a and the switch 36b controlled by a signal Select1b. These signals are, for example, generated by the control means 814 (FIG. 8), wherein in this case the pinned photodiode 12 exemplarily represents a pixel of the pixel array 812.

Figure 8:
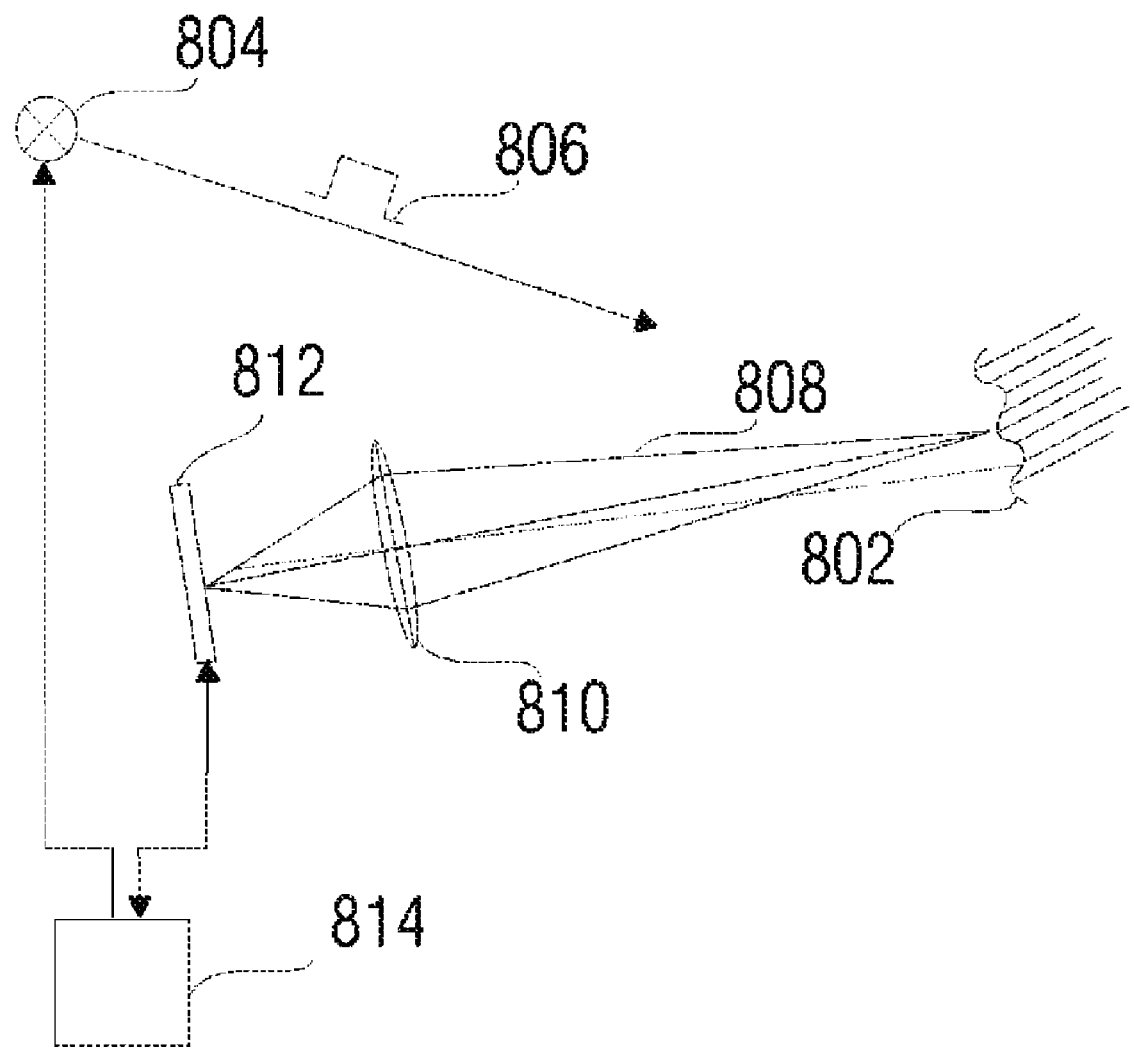
FIG. 8 is a schematic drawing of a 3D measuring system.
Figure 9:
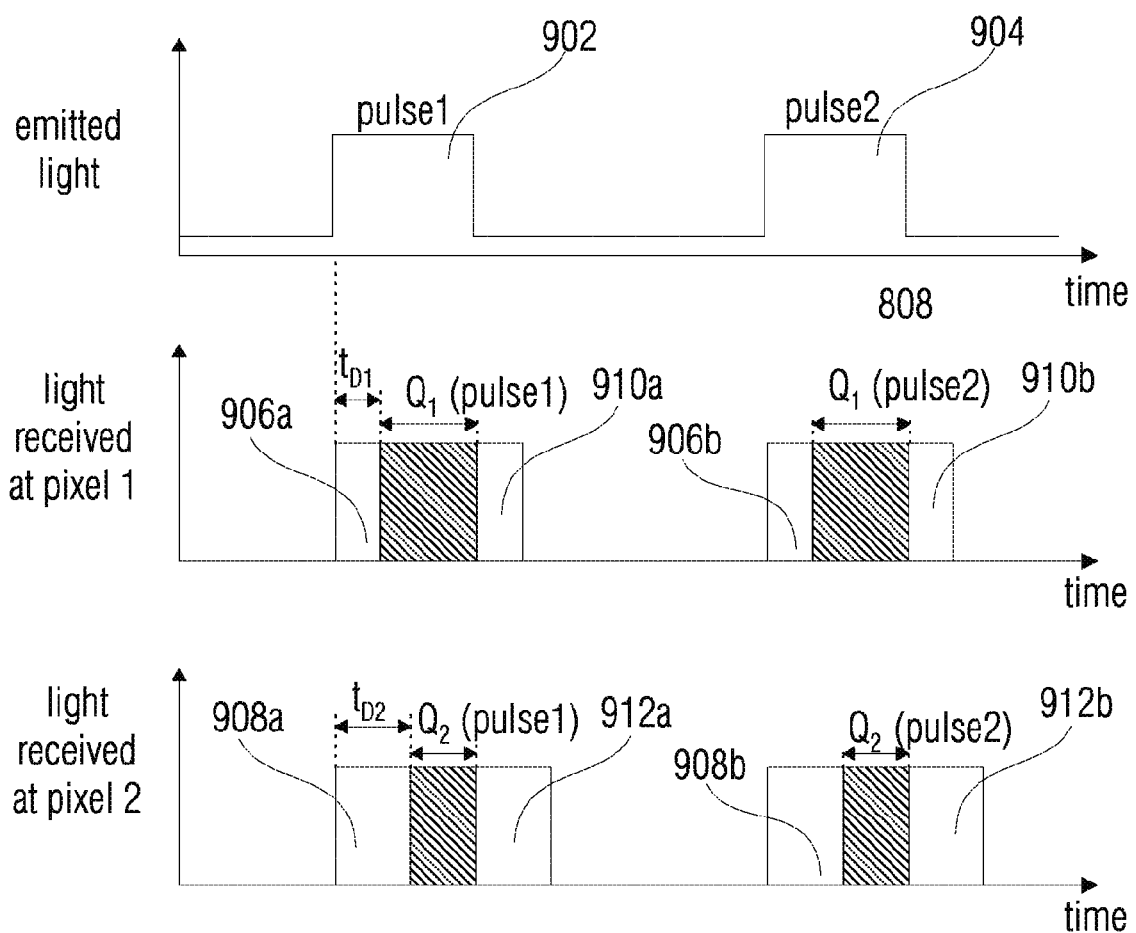
FIG. 9 shows graphs where exemplary wave forms as they occur in a measuring system of FIG. 8 when using a pulse method are plotted.

The mode of functioning of the device of FIG. 1 will be discussed below referring to FIG. 3, wherein at the same time reference is made to FIGS. 1 and 2 and, where appropriate, also to FIG. 8.

Figure 3:
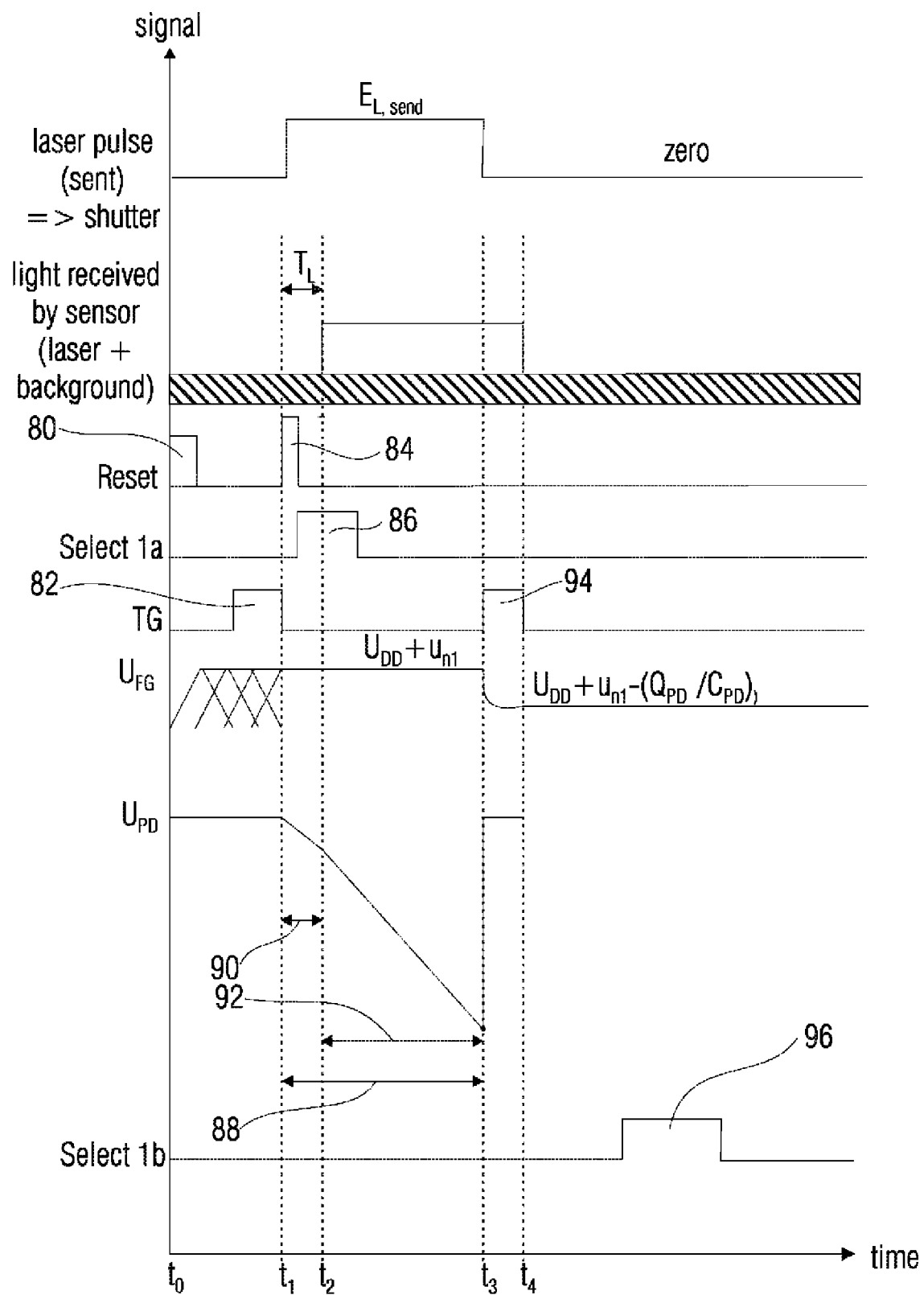
FIG. 3 shows graphs where exemplary time wave forms of signal and switching voltages as they occur in the device of FIG. 1 are shown.

FIG. 3 shows a series of signals, time being plotted on the x axis. The top illustration shows the time wave form of the sending process of a light pulse 806 sent by the light source 804. Directly below that is the time wave form of the intensity of the reflected light pulse incident on the photodiode 22, the light pulse arriving at the sensor 812 offset by the light propagation time $T_L$. The next thing shown is the signal Reset by means of which closing the switch 18 of FIG. 1 is controlled. What follows is the representation of the signal Select1a for opening/closing the switch 36a, followed by the signal TG for opening/closing the switch 14. The next thing shown below is the representation of the voltage form $U_{FD}$ across the readout capacitance 16 and the voltage form $U_{PD}$ as results across the photodiode capacitance 24. The signal Select1b controls closing the switch 36.

Before image recording, the n-well 54 of the pinned photodiode 12 has to be depleted so that the so-called "pin potential" $U_{PD}=U_{pin}$ will form at the p-n junction 60 across the junction capacitance. At first, the readout capacitance 16 is brought to the potential of the supply voltage $U_{DD}$ by means of the reset signal 80. After that, the actual depletion of the n-well 54 from the photodiode 12 is controlled by the signal 82, whereby switch 14 is closed and charges still stored on the photodiode capacitance 24 dissipate to the readout capacitance 16 at the potential $U_{PD}$. With the falling edge of signal 82, at the time $t_1$, a phase 88 of charge accumulation begins where the photo-generated charge carriers are accumulated in the space charge zone of the pinned photodiode 12 and the potential $U_{PD}$ at the photodiode capacitance 24 decreases proportionally from the starting potential $U_{pin}$ to the light quantity detected. At the time $t_1$, simultaneously to the falling edge of the signal 82, the readout capacitance is reset again by the reset signal 84, wherein, after the falling edge of the signal 84, a voltage $U_{FD}$ made up of the supply voltage $U_{DD}$ and a noise voltage portion $u_{n1}$ is applied across the readout capacitance 16, the result being $U_{FD}=U_{DD}+u_{n1}$.

After the end of the reset pulse 84, the switch 36a is closed by the signal 86 and the voltage state of the readout capacitance 16 is read out in a non-destructive manner via the unity-gain amplifier 30 of FIG. 1 and latched in an analog manner by the capacitance 40a and the respective unity-gain amplifier 38a. The reset noise contribution is read out and stored by resetting by the signal 84 and subsequently reading out the readout capacitance 16 by the signal 86 during the phase 88 of charge accumulation of the pinned photodiode 12. The phase 88 of charge accumulation of the pinned photodiode 12 includes a first phase 90 when the reflected light signal has not yet reached the sensor 812 due to its finite light propagation time $T_L$ so that only the natural background light intensity $E_H$ is detected by the pinned photodiode 12, and thus the potential $U_{PD}$ across the photodiode capacitance 24 only decreases proportionally to $E_H$ during the phase 90. After the light propagation time $T_L$, the reflected light reaches the photodiode 12 so that, up to the end of charge accumulation at the time $t_3$ during a phase 92 of charge accumulation, the potential $U_{PD}$ across the photodiode capacitance 24 decreases faster than during the phase 90, since the photodiode 12 now detects the sum of the background light intensity $E_H$ and the laser light intensity $E_L$. The influence of the background light on the readout result can be corrected according to another embodiment of the present invention of FIG. 4, which will be discussed there in greater detail.

At the end of the accumulation phase 88 of the photodiode 12, at the time $t_3$, the accumulated photocharge $Q_{PD}$ is transferred to the readout capacitance 16 by the signal 94. During the duration of the transfer phase determined by the signal 94, free photocharge carriers continue to be generated by the photodiode 12, however they dissipate directly to the readout capacitance 16 so that during the transfer phase the voltage $U_{PD}$ at the photodiode capacitance 24 does not decrease, as is the case during the accumulation phase 88. Due to the fact that the reset noise portion is still resident on the readout capacitance 16, the signal is corrupted by this contribution so that the voltage $U_{FD}=U_{DD}+u_{n1}-(Q_{PD}/C_{FD})$ is applied to the readout capacitance 16 after the end of the charge transfer at the time $t_4$. After the end of the charge transfer phase controlled by a signal 94, the voltage $U_{FD}$ at the readout capacitance 16 is read out via the unity-gain amplifier 30 in a manner controlled by a signal 96 and latched in an analog manner on the capacitance 40b and the respective unity-gain amplifier 38b. The voltage at the output of the difference calculator 34 will then be $U_{out,CDS}=Q_{PD}/C_{FD}$, which means that the reset noise portion in the signal at the output of the difference calculator is eliminated.

An advantage of the embodiment of FIGS. 1-3 is that a complete sequence of light pulses can be recorded in succession by means of the detection device 10 without having to reset the readout capacitance 16 again after each light pulse. This causes a significant improvement in the signal-to-noise ratio of the readout value stored on the latch capacitance 40b, since a reset noise contribution only occurs one single time for a repeated charge accumulation, i.e. signal multiplication.

Another accumulation phase of the pinned photodiode in FIG. 3 could begin with the falling edge of the signal 94 at the time $t_4$ when the switch 14 is opened again and the accumulated photocharge carriers reduce the voltage $U_{PD}$ across the photocapacitance 24 again, as has occurred in analogy during the first accumulation phase 88. Thus, n successive light pulses can be recorded by the detection device 10 with only one single reset process so that the signal-to-noise ratio can be improved significantly by multiple pulse recording.

Recording laser light can thus be performed for one single or for many successive light pulses by means of the detection device 10. In single-pulse operation, the photodiode 12 and the readout capacitance and/or the floating-diffusion capacitance 16 are usually reset by means of the reset switch 18 before each new pulse and the noise in the CDS stage 32 is corrected. In multi-pulse operation, the photocharge of successive light pulses is accumulated in the readout capacitance 16.

In the detection device 10, the magnitude of the output voltage at the readout capacitance 16 may be selected freely within broad limits in dependence on the ratio of the photodiode capacitance 24 and the readout capacitance 16, i.e. the sensitivity of the detection device 10 is not solely determined by the geometrical extension of the pinned photodiode 12. For clarification purposes, FIG. 2 shows a potential form 100 as forms within the detection device. A potential well 102 depending on the supply voltage $U_{DD}$ forms below the supply voltage terminal 64. Directly after the reset process 80, the supply voltage $U_{DD}$ is also across the readout capacitance 16 so that a potential well 104 below the n-well 62 representing the readout capacitance 16 at this time has the same depth as the potential well 102. The depth of a potential well 106 below the pinned photodiode 12 is determined by the voltage $U_{pin}$ settling across the depleted p-n junction 60.

The magnitude of the photodiode capacitance 24 across the p-n junction 60 is determined by the doping of the semiconductor material used and additionally depends on the geometrical extension of the n-doped well 54. The photocharges 108 generated ($Q_{PD}$) are accumulated in the potential well 106 below the photodiode 12, the depth of the potential well 106 decreasing with an increasing number of photocharges. During the transfer phase, the accumulated charges $Q_{PD}$ are transferred to the readout capacitance 16, i.e. accumulated in the potential well 104, where they are added to charges 110 ($Q_{FD}$) which may already be present in the potential well 104. Assuming $\Delta U_{PD}=Q_{PD}/C_{PD}$, the following results: $\Delta U_{FD}=(C_{PD}/C_{FD})*\Delta U_{PD}$. The signal swing $\Delta U_{PD}$ across the photodiode 12 thus is present at the output 30 amplified by the factor ($C_{PD}/C_{FD}$). A voltage swing $\Delta U_{FD}=Q_{PD}/C_{FD}$ per transfer process is achieved. The signal swing $\Delta U_{FD}$ of the readout signal and thus the sensitivity of the receiving device 10 may thus be varied, with a predetermined geometry of the photodiode 12, by selecting the readout capacitance $C_{FD}$, wherein a compromise has to be made between clock punch-through and amplification achievable.

In single-pulse operation, the readout capacitance 16 is reset and the noise contribution read out before charge accumulation. In single-pulse operation, the highest signal amplification possible is desirable, so that in this case the readout capacitance 16 ($C_{FD}$) would be selected to be small compared to the photodiode capacitance 24 ($C_{PD}$), wherein exemplarily $C_{PD}=7$ pF and $C_{FD}=1$ pF are possible values. In addition, single-pulse recording may be repeated as often as desired, wherein the readout capacitance is reset and the noise contribution is read out between successive light pulses so that the noise contribution in the final readout result is compensated completely and is independent of the pulse number N selected.

When using the detection device 10 as a single light-sensitive pixel of a two-dimensional pixel array in the sensor 812, for each pixel, the noise voltage portion read out by means of the signal 86 and the noise voltage portion read out by the signal 96 and depending on the photocharges generated have to be stored individually for each pixel in an analog manner, like, for example, "on-chip", i.e. on the sensor. For small numbers of pixels, this may still be realized, but no longer in large pixel matrices. With large pixel matrices, the noise contribution consequently is not read out before, but instead N light pulses are recorded in sequence and transferred to the readout capacitance 16 so that the noise error occurs once in the entire readout result. Here, the noise contribution is not read out before, but occurs once, independently of N, in the readout result. The readout capacitance 16 in this latter case would be selected to be relatively large in relation to the photodiode capacitance 24 so that a small number of charge transfers of the photodiode capacitance 24 to the readout capacitance 16 does not already decrease the depth of the potential well 104 so strongly that the mode of functioning of the detection device of FIG. 2 is no longer guaranteed. Typical values of a corresponding usage of the detection device would, for example, be $C_{PD}=7$ pF and $C_{FD}=3-5$ pF. High-resolution distance detector matrices can consequently be realized by this method, which has not been possible so far due to too much noise.

The problem of interfering noise caused by resetting is solved and/or reduced strongly in all methods by the detection device, the voltage swing and/or the charge amplification at the readout capacitance 16 ($C_{FD}$) is proportional to the ratio $C_{PD}/C_{FD}$.

Figure 4:
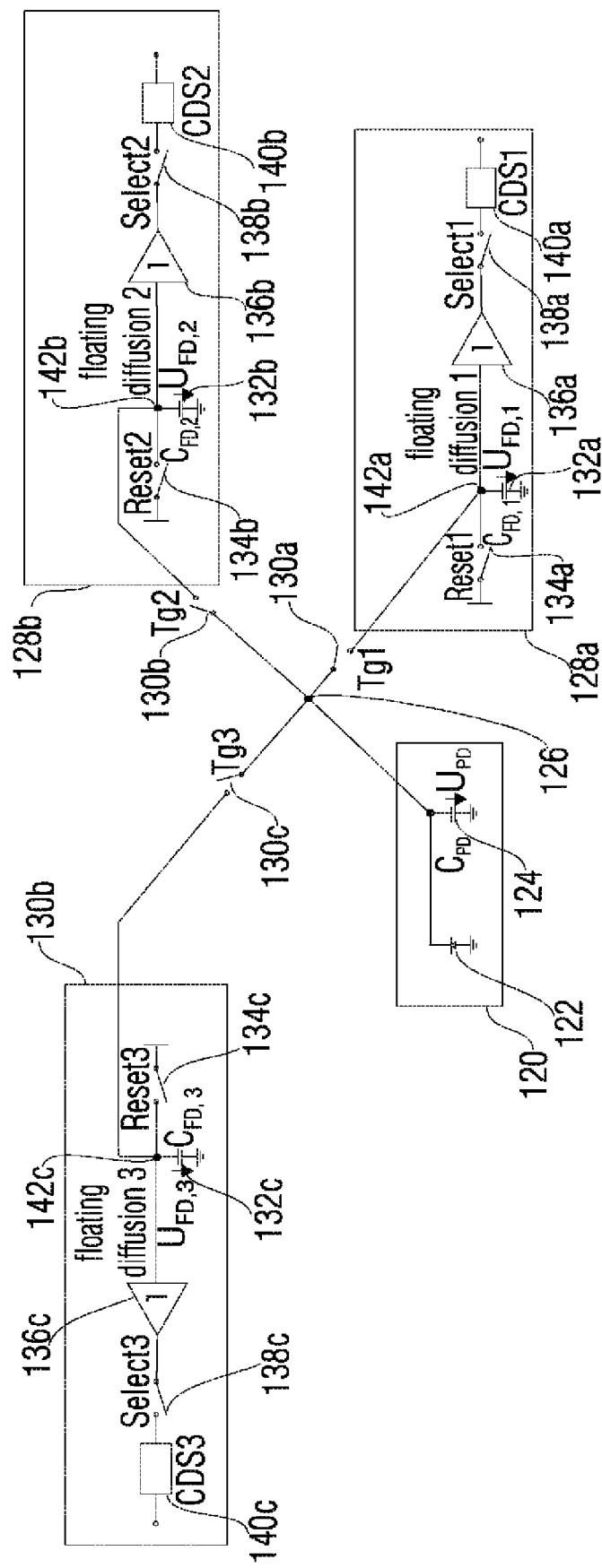
FIG. 4 is a circuit diagram of an optical detection device according to another embodiment of the present invention.

According to another embodiment of the present invention shown in FIG. 4, correction of the undesired background light portion in the readout signal can be performed efficiently. Extending the detection device of FIG. 1, a way of connecting the pinned photodiode to three circuit nodes and/or floating-diffusion nodes and thus to three output capacitances is provided, wherein this embodiment may be extended nearly arbitrarily.

FIG. 4 shows the pinned photodiode 120 the photo-sensitive p-n junction 122 and the photodiode capacitance 124 of which are connected between ground and a circuit node 126. Additionally, the circuit includes three, on the circuit side, identical readout branches 128a, 128b and 128c and three switching means 130a, 130b and 130c. The readout branch 134a includes a readout capacitance 132a, a reset switch 134a, a unity-gain amplifier 136a, a readout selection switch 138a and a CDS stage 140a. The readout branch 128b includes a readout capacitance 132b, a reset switch 134b, a unity-gain amplifier 136b, a selection switch 138b and a CDS stage 140b. The readout branch 128c includes a readout capacitance 132c, a reset switch 134c, a unity-gain amplifier 136c, a readout selection switch 138c and a CDS stage 140c. The CDS stages are not illustrated in detail, but only schematically.

The circuit node 126 is connected to the circuit node 142a of the first readout branch 128a via switch 130a, is connected to the circuit node 142b of the second readout branch 128b via switch 130b and is connected to circuit node 142c of the third readout branch 128c via switch 130c. The circuit node 142a can be connected to a supply voltage $U_{DD}$ not shown via switch 134a. The readout capacitance 132a is connected between ground and the circuit node 142a of the first readout branch, the circuit node 142a being further connected to the input of the unity-gain amplifier 136a. The output of the unity-gain amplifier 136a may be connected to the input of the CDS stage 140a (CDS1) illustrated here only schematically by means of switch 138a. The circuit node 142b of the second readout branch can be connected to the supply voltage $U_{DD}$ via switch 134b. The readout capacitance 132b is connected between the circuit node 142b and ground. The input of the unity-gain amplifier 136b is connected to the circuit node 142b, the output of the unity-gain amplifier 136b being connected to the input of the CDS stage 140b (CDS2) via switch 138b. The circuit node 142c of the third readout branch can be connected to the supply voltage $U_{DD}$ via switch 134c. The readout capacitance 132c is connected between the circuit node 142c and ground. The input of the unity-gain amplifier 136c is connected to the circuit node 142c, wherein the output of the unity-gain amplifier 136c can be connected to the input of the schematically illustrated CDS stage 140c (CDS3) via the switch 138c.

Using the embodiment of the present invention shown in FIG. 4, the signal accumulated by a pinned photodiode 126 can be evaluated such that effects resulting from the influence of background light and reset noise can be eliminated. Here, the photocharge $Q_{PH}$ proportional to the light may be shifted from the photodiode 120 to the readout capacitances 132a and 132b at different times such that the background light portion can be separated from the laser light portion. The third readout branch 128c via the switch 130c here only serves for asynchronously setting the photodiode 120 at any time, which is necessary to be able to erase dark currents and light incident on the photodiode 120 before the actual laser signal recording. It is of advantage for the reset switch 134c of the third readout branch 128c to remain closed all the time before and after the acquisition phase. The depletion of the photodiode 120 takes place exclusively by closing switch 130c, preventing a non-correctable reset noise portion from remaining on the photodiode capacitance 124, as would be the case if at first switch 130c and after that switch 134c were closed for the purpose of resetting the photodiode 120. Consequently, the first-mentioned switching order is to be used.

Figure 5:
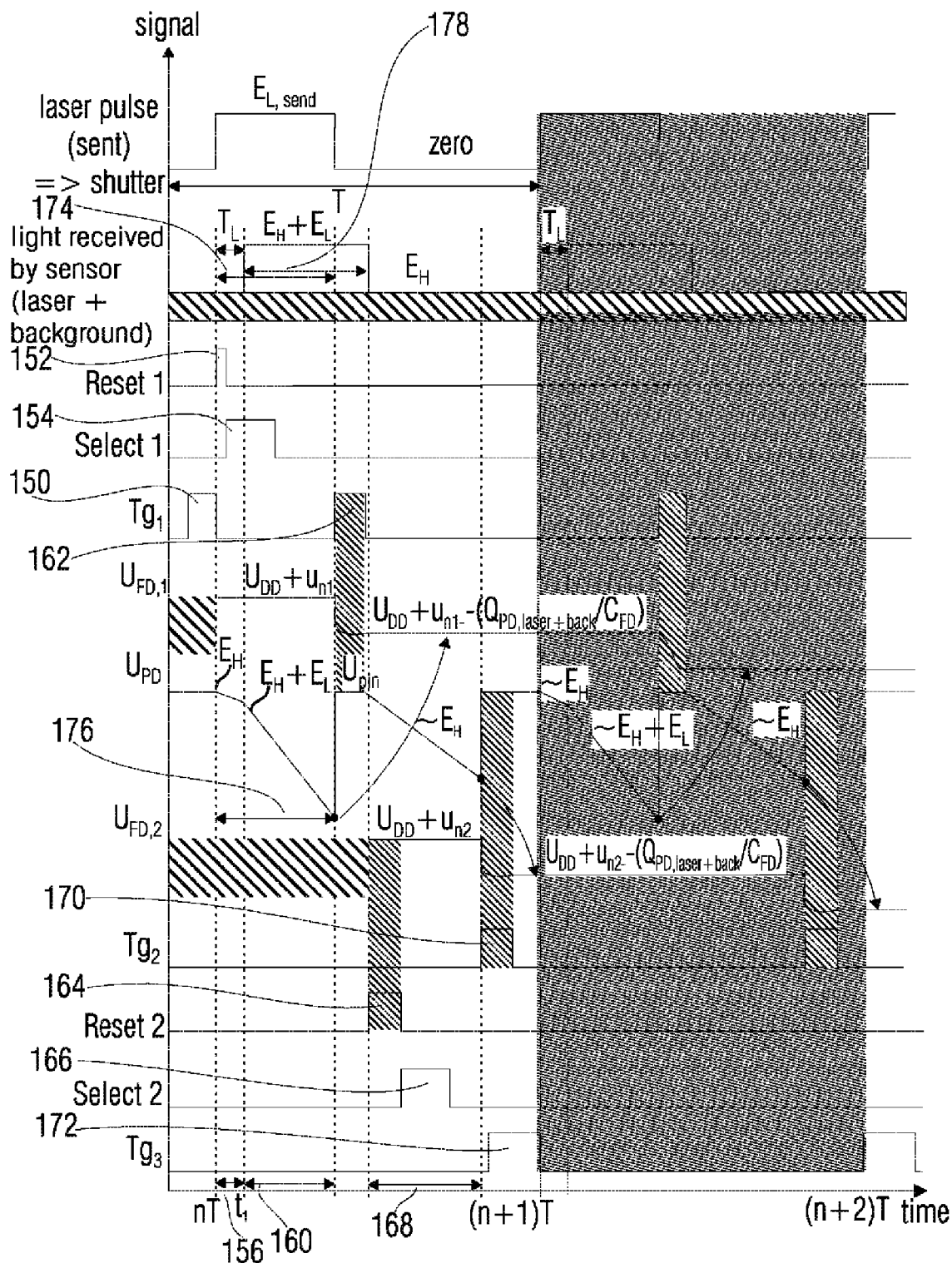
FIG. 5 shows graphs where exemplary time wave forms of signal and switching voltages as they occur in the device of FIG. 4 are shown.

The mode of functioning of the embodiment of FIG. 4 will be explained below referring to FIG. 5, wherein the detection device of FIG. 4 is exemplarily operated as a pixel of the light-sensitive sensor 812 for depth measurements, wherein both the contribution of the background light and the contribution of the reset noise in the readout result are to be corrected. Synchronizing the emission of the light pulse 806 of the light source 804 at the actuating times of the switches 130a, b, c 134a, b, c and 138a, b, c by means of suitable signals here is performed by the control means 814. In FIG. 5, time is plotted on the x axis measured in units T, the duration of a complete accumulation cycle, which includes a charge accumulation phase including active scene illumination and a charge accumulation phase without active scene illumination. The signals Reset1 for actuating switch 134a, Select1 for actuating switch 138a, TG1 for actuating switch 130a, TG2 for actuating switch 130b, Reset2 for actuating switch 134b, Select2 for actuating switch 138b and TG3 for opening and closing switch 130c are generated by the control means 814.

What is also illustrated is the voltage $U_{FD,1}$ across the readout capacitance 132a of the first readout branch 128a, the voltage $U_{FD,2}$ across the readout capacitance 132b of the second readout branch 128b and the voltage $U_{PD}$ across the photodiode capacitance 124. Generally, the following applies for the node voltage $U_{PD}$ and the node voltages $U_{FD}$ across the readout capacitances 132a, b or c ($C_{FD}$) during the charge accumulation and/or transfer phase, where one of the switches 130a, b or c is closed:

$$U_{PD} = \frac{Q_{PD}}{C_{PD}} \wedge U_{FD} = \frac{Q_{PD}}{C_{FD}} \qquad \text{(Equ. 1)}$$

At the beginning of a complete data recording cycle, the switch 130a is closed by a signal 150 and the photodiode 120 is thus depleted. With the falling edge of the signal 150, at the time nT, a phase 176 of charge accumulation of the photodiode 120 begins, wherein the readout capacitance 132a is reset by a signal 152 at the time nT, simultaneously with the falling edge of the signal 150. After resetting the readout capacitance by the signal 152, the voltage state across the readout capacitance 132a containing the contribution of the reset noise charge and/or kTC noise charge is read out in a non-destructive manner by means of a signal 154, via the unity-gain amplifier 136a, and latched in the CDS stage 140a which is implemented equivalently to the embodiment of FIG. 1. The following applies for this readout value $U_{FD1,reset}$:

$$U_{FD1,reset} = \frac{Q_{reset}}{C_{FD}} = U_{DD} + u_{n1} \qquad \text{(Equ. 2)}$$

$u_{n1}$ describing the voltage portion resulting from the reset noise. Simultaneously with the falling edge of the signal 150, at the time nT, transmitting the laser pulse 806 is triggered by the control means 814. It hits the sensor again after the propagation time $T_L$ which is proportional to the distance of an object point to the pixel.

In a first phase 156 of charge accumulation of the duration $T_L$, only the natural background light is detected by the photodiode 120, which is why in the phase 156 the voltage across the photodiode capacitance 124 ($U_{PD}$) decreases proportionally to the intensity of the background light $E_H$. Starting from the reflected light pulse impinging at the time $t_1$, the change in voltage across the photodiode capacitance 124 in a second phase 160 of charge accumulation is proportional to the sum of the intensities of the background radiation $E_H$ and the intensity $E_L$ of the laser light, which is why in the second phase 160 the voltage $U_{PD}$ across the photodiode capacitance decreases faster than in the phase 156. At the end of the charge accumulation phase, the accumulated photocharge $Q_{PD,laser+back}$ is transferred to the readout capacitance 132a by a signal 162, which again depletes the photodiode 120. At the end of the charge transfer, i.e. with the falling edge of the signal 162, the following applies for the voltage $U_{FD1,signal}$ across the readout capacitance 132a:

$$U_{FD1,signal} = \frac{Q_{signal}}{C_{FD}} = U_{DD} + u_{n1} - \underbrace{\frac{Q_{PD,laser+back}}{C_{FD}}}_{U_{signal}} \quad \text{Equ. 3}$$

The voltage $U_{FD1,signal}$ is composed of the voltage $U_{DD}$, a noise voltage portion $u_{n1}$ and a voltage portion $U_{signal}$ resulting from the accumulated photocharges, wherein both background light and part of the reflected laser light pulse have been used for generating the photocharge. With the falling edge of the signal 162, another phase 168 of charge accumulation of the photodiode 120 is started, wherein this time the light source 804 does not emit any light pulses.

Simultaneously with the falling edge of the signal 162, the readout capacitance 132b of the second readout branch is reset by a signal 164 and, after that, after the end of the reset process, i.e. with the falling edge of signal 164, the voltage state UFD,2 of the readout capacitance 132b is stored, by a signal 166, in the CDS stage 140b of the second readout branch 128b, this voltage value containing the noise voltage portion. In the second phase 168 of charge accumulation, the photodiode 120 does not receive reflected laser light, so that the voltage drop $U_{PD}$ across the photodiode capacitance 124 is proportional to the background light intensity $E_H$ during the entire phase 168 of charge accumulation. At the end of the accumulation phase, the accumulated photocharge $Q_{PD}$,back is transferred to the readout capacitance 132b of the second readout branch 128b by a signal 170 so that with the falling edge of signal 170 the voltage $U_{FD2,signal}$ is across the readout capacitance 132b and the following applies:

$$U_{FD2,signal} = U_{DD} + u_{n2} - \underbrace{\frac{Q_{PD,back}}{C_{FD}}}_{U_{signal,back}} \wedge U_{FD2,reset} = U_{DD} + u_{n2} \quad \text{Equ. 4}$$

Eliminating the kTC noise for the individual readout branches 128a and 128b takes place by calculating the difference in the downstream CDS stages 140a and 140b, wherein equation 2 is to be subtracted from equation 3 for the first readout branch 128a and the difference of $U_{FD2,signal}$ and $U_{FD2,reset}$ of equation 4 is calculated for the readout branch 128b.

Successive accumulation of N light pulses is assumed for further consideration for correcting the background light portion, wherein the possibility of multiple accumulation is indicated in the right hatched part of FIG. 5. Here, the charge accumulation cycle of the duration T, as described before, is repeated, wherein it should be kept in mind that the photodiode 120 has to be depleted before starting a new charge accumulation, which may then only take place by a signal 172 via the third readout branch 128c in order not to corrupt the signal charges stored on the readout capacitances 132a and 132b. In the further recording cycles of the duration T, resetting the readout capacitances 132a and 132b by means of the signals 152 and 164 is to be refrained from since the noise voltage portion may only be read out in the first one of N cycles in order not to erase the signal charges stored on the readout capacitances 132a and 132b.

For further considerations as to correcting the background light portion, it will subsequently be assumed that a number N of complete acquisition cycles of a duration T have been performed by multiple accumulation. All in all, the following results as readout signals $U_{FD1,signal}$ and $U_{FD2,signal}$ of the readout branches 128a and 128b of FIG. 4, related to a reference voltage $U_{ref}$:

$$U_{FD1,signal} = U_{ref} - N \cdot \frac{Q_{PD,laser+back}}{C_{Fd}} \wedge U_{FD2,signal} = U_{ref} - N \cdot \frac{Q_{PD,back}}{C_{Fd}} \quad \text{Equ. 5}$$

Thus, as described before, the portion of reflected laser light is contained in the signal UFGD1,signal, whereas only the background light portion is contained in the signal UFD2, Signal.

Calculating the difference of the terms UFD1,signal and UFD2,signal eliminates the background light portion:

$$U_{distance} = N \cdot \frac{Q_{PD,laser}}{C_{FD}} \quad \text{(Equ. 6)}$$

Calculating the difference usually takes place directly on the CMOS sensor. The difference $U_{distance}$ of equation 6 only carries noise-corrected laser light charge information proportional to the distance. Equation 6 may be converted as follows using the spectral sensitivity $S_{spectral}$ of the photodiode, the received residual energy of the laser signal $E_L$ and a length 174 of the laser pulse $T_{shutter}$:

$$U_{distance} = N \cdot \frac{S_{spectral} \cdot E_L \cdot (T_{shutter} - T_L)}{C_{FD}} \quad \text{(Equ. 7)}$$

The correction of the background light portion in the readout signal $U_{distance}$ has already taken place at this time, since the readout result $U_{distance}$ only contains a portion which depends on light propagation time $T_L$ and the residual energy of the laser signal $E_L$ received at the sensor. However, generally the received residual energy of the laser signal $E_L$ will vary from pixel to pixel within the sensor 812, even with equal distances of all pixels of the sensor 812 to the reflecting object 802, since the reflectance at the surface of the object 802 to be examined is not spatially constant.

In order to achieve high precision of the readout result, the reflectance variation on the surface of the object 802 has also to be corrected. In order to obtain a readout result $U_{distance,ref}$, another complete readout cycle of the length T including background light correction is performed, wherein the laser signal 174 has to have the same length like in the first complete accumulation cycle for determining the distance-dependent signal $U_{distance}$.

The difference to the first complete accumulation cycle is that the length of the shutter signal 176 has to be so great that it is ensured that each pixel on the sensor 812 will receive the complete laser pulse during its entire active phase of charge accumulation 176. In other words, this means that, on the one hand, the falling edge of the signal 150 at the time nT, and thus the beginning of the active charge accumulation, for all the pixels has to be temporally before the reflected light pulse 178 arriving, so that a pixel is prevented from detecting a signal portion resulting already from laser light, during the period of time $T_L$, namely the light propagation time. Additionally, the length of the transmitted light pulse 174 has to be at least of a size so as to ensure that all the pixels of the sensor 812 have received the signal of the reflected laser light at the falling edge of the signal 162, i.e. at the time of the end of the charge accumulation phase. Thus, it is ensured that all the pixels detect laser light during their entire charge accumulation phase of the duration $T_{shutter}$ so that the signal $U_{distance,ref}$ which no longer depends on the light propagation time $T_L$ is obtained at the end of a complete readout cycle of the duration T.

$$U_{distance,ref} = N \cdot \frac{S_{spectral} \cdot E_L \cdot T_{shutter}}{C_{FD}} \quad \text{(Equ. 8)}$$

This second pulse sequence of equal laser duration, but considerably longer shutter time, serves for correcting reflectance variations which influence the amount of reflected laser light $E_L$, and the correction of deviations of the spectral sensitivity. The quotient ($U_{distance,ref}/U_{distance}$) is calculated for correction purposes, wherein at the same time the light propagation time $T_L$ is substituted by means of introducing the distance d from the object point to the respective pixel and the speed of light c, so that the following applies:

$$\frac{U_{distance,ref}}{U_{distance}} = \frac{T_{shutter}}{T_{shutter} - \left(\frac{d}{2c}\right)} \quad \text{(Equ. 9)}$$

Solving the equation for the distance d of the pixel to the respective object point has the following result:

$$d = 2c \cdot T_{shutter} \cdot \left(1 - \frac{U_{distance}}{U_{distance,ref}}\right) \quad \text{(Equ. 10)}$$

This shows that, using a pinned photodiode 120 and a respective readout circuit according to FIG. 4, a readout result can be obtained in an efficient manner in which, when using a receiving device of FIG. 4 in a two-dimensional pixel array of a sensor 812 for depth measurements, the readout signal is completely freed of reset noise portions and background light portions, and in which a correction of the variable reflectance of the object 802 to be examined has also been performed. Due to the little noise, large-area sensor matrices including high pixel numbers may be realized, which, for example in security-relevant applications, allow reliable distance and depth map images to be recorded.

Figure 6:
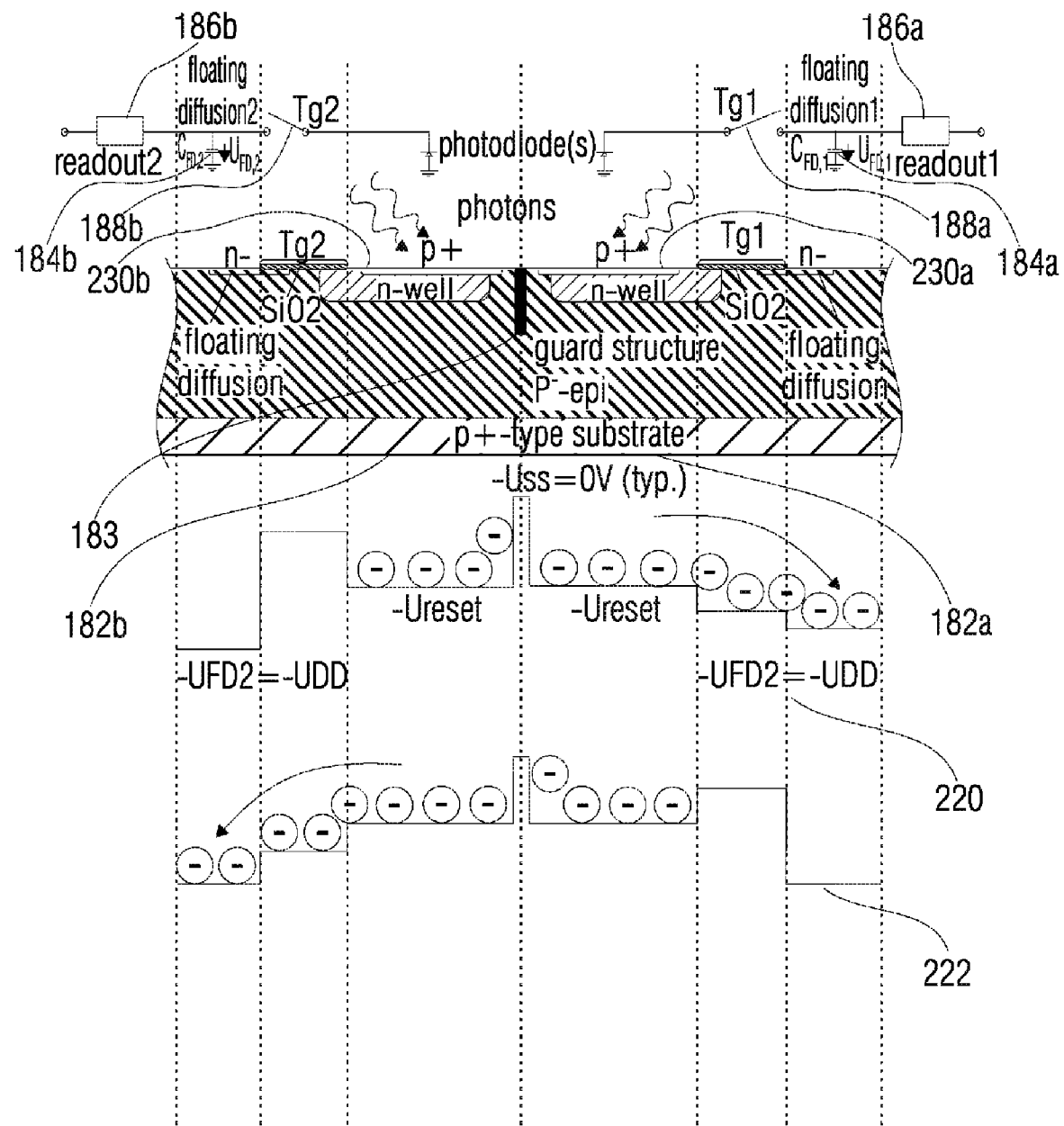
FIG. 6 is a schematic drawing of an optical detection device according to another embodiment of the present invention.

In another embodiment of the present invention of FIG. 6, two pinned photodiodes 182a and 182b are used as an independent light-sensitive detector element and/or as a subpixel of a superpixel including the photodiodes 182a and 182b of a sensor 812 for depth measurements, wherein measuring distances by means of the modulation method presented in PCT/DE00/03632 is made possible by the arrangement illustrated in FIG. 6.

The basic principle of the method is controlling the phases of charge accumulation and respective readout of one or several light-sensitive pixels by means of a modulation signal and synchronizing same with an emitted modulated light signal. Depending on the distance of the scene objects, the phase position of the reflected modulation light relative to the modulation signal changes, the consequence being that the quantity of photoelectrons generated in the pinned photodiode increases or decreases, depending on the phase difference.

The exemplary implementation of the modulation method by means of the pinned photodiodes 182a and 182b in FIG. 6 is to be described subsequently referring to FIG. 7 which explains the basic mode of functioning of the modulation method in greater detail. FIG. 6 shows the semi-schematic illustration of the pinned photodiodes 182a and 182b which are electrically separated from each other by a guard structure 183 in order to avoid electrical crosstalk. A detailed description of the semiconductor structure and the equivalent circuit diagram of the photodiodes is omitted here since this has already been explained in detail in FIGS. 1 and 2.

Reading out a readout capacitance 184a from the photodiode 182a is performed by a readout device 186a which is only illustrated here schematically and exemplarily corresponds to the readout device shown in FIG. 1. A readout capacitance 184a of the photodiode 182b may equivalently be read out by a readout device 186b. In the embodiment shown, the control means 814 synchronizes the transfer times of the charge carriers accumulated in the photodiodes 182a and 182b to the readout capacitances belonging to the respective photodiodes by means of a modulation signal by means of which a switch 188a and a switch 188b are opened and closed at times preset by the modulation signal. In this way, the phase difference between the transmitted and the received signal—and thus the distance information—is contained in the charge quantity transferred to the readout capacitances 184a and 184b.

Figure 7:
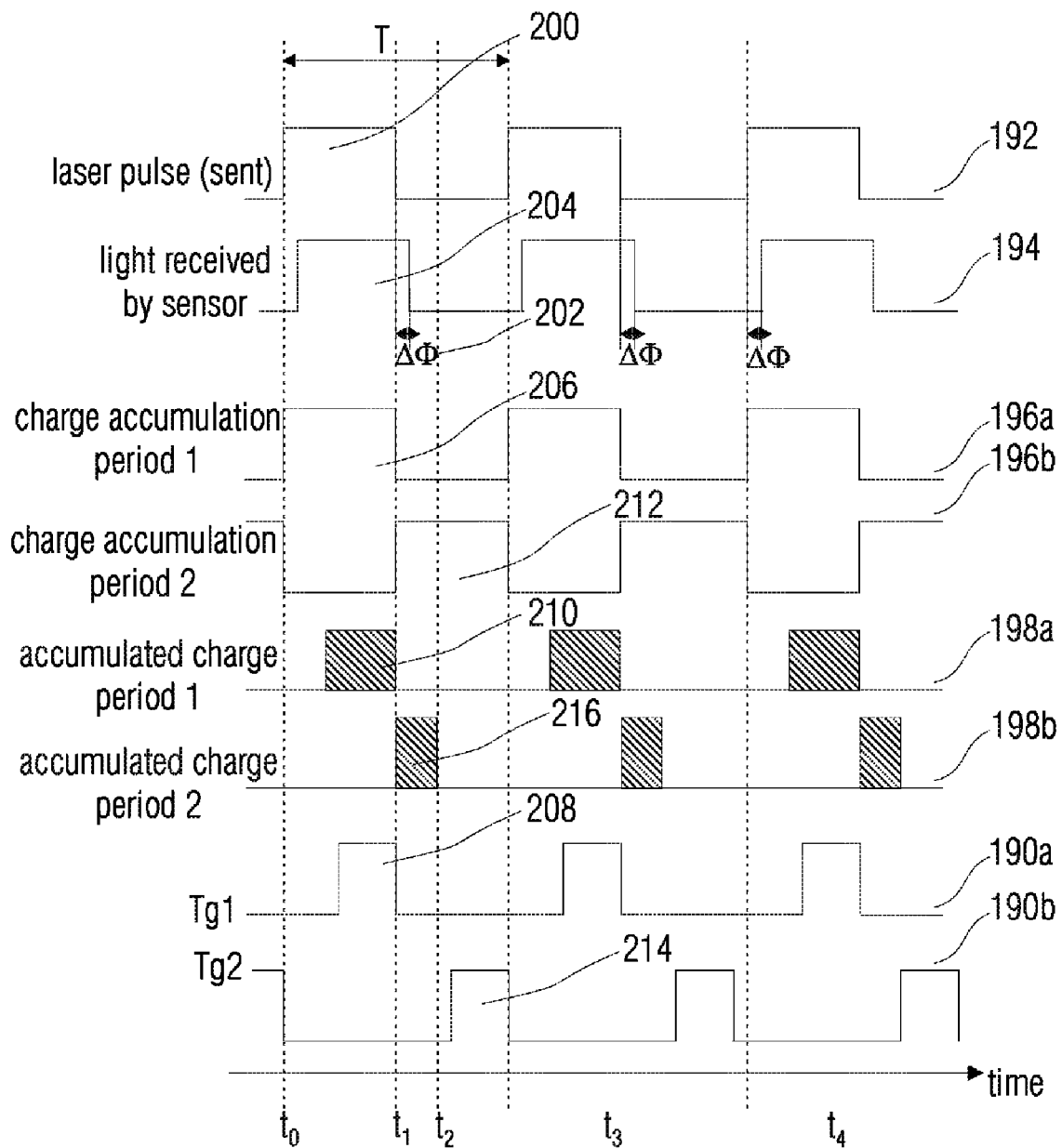
FIG. 7 shows graphs where exemplary time wave forms for illustrating the mode of functioning of the device of FIG. 6 are shown.

It is explained using FIG. 7 how the control means controls the transfer times of the charges to the readout capacitances 184a and 184b by signals 190a and 190b using a preset modulation signal so that the desired readout result can be achieved. In FIG. 7, the time t is plotted on the x axis and the figure also shows a light signal 192 modulated by the control means, which here is a number of square-wave pulses, and the reflected light signal 194 arriving at the sensor 812. Additionally, active phases 196a and 196b of the charge accumulation of the photodiodes 182a and 182b are illustrated, as controlled by the control means 814. The charges 198a and 198b accumulated on the readout capacitances 184a and 184b are indicated in arbitrary units. The control signal 190a (TG1) serves for actuating the switch 188a and the control signal 190b (TG2) serves for actuating the switch 188b, both being generated by the control means and synchronized with the light signal.

At the beginning of a readout cycle of the duration T, the laser light pulse 200 is transmitted which arrives at the sensor as a reflected light pulse 204 with a phase shift 202 (ΔΦ) to be determined. At the beginning of the cycle of the duration T, at the time $t_0$, the photodiode 182a is controlled by the control means 814 such that it will be in a phase of active charge accumulation for a time period 206 up to the end of light pulse emission, i.e. the falling edge of the signal 200. At the end of the accumulation phase 206, at the time $t_1$, the charge of the photodiode 182a is transferred to the readout capacitance 184a by a control signal 208, wherein the charge transfer phase ends with the falling edge of the signal 208 so that the charge 210 indicated in arbitrary units will be on the readout capacitance 184a at the time $t_1$. When light pulse emission ends, at the time $t_1$, the active charge accumulation phase of the photodiode 182a is stopped by the control means and what begins temporally is a phase 212 of active charge accumulation of the photodiode 182b. At the end of the accumulation cycle of the duration T, at the time $t_3$, the accumulated charge of the photodiode 182b is transferred to the readout capacitance 184b by the control means by means of the signal 214 so that the charge 216 represented in arbitrary units will be on the readout capacitance 184b at the end of the complete accumulation cycle of the length T.

As can be seen from FIG. 7, the magnitude of the charges 210 and 216 accumulated on the readout capacitances depends on the phase shift 202 between the transmitted signal and the reflected signal. Evaluating means calculates, after a predetermined number N of successive cycles of the duration T, the difference of the accumulated charges 210 and 216 which directly contains the information on the phase shift ΔΦ and thus the distance of the object point to the pixel. In an extreme case of an object located directly at the sensor, the phase shift 202 would be zero and thus the accumulated charge 210 in the photodiode 182a would be maximum, whereas the accumulated charge 216 in the photodiode 182b is zero, so that the difference of the accumulated charges 210 and 216 in this case would be maximum.

In order to illustrate the realization of the method by means of the semiconductor structure shown in FIG. 6, FIG. 6 also shows the potential form 220 as results during the transfer phase 208 in the semiconductor structure, and the potential form 222 as results in the semiconductor structure during the transfer phase 214. During the transfer phase 208, the switch 188a is closed so that the charge carriers accumulated in the photodiode 182a are transferred to the readout capacitance 184a by the potential gradient illustrated in 220. At the same time, the switch 188b is opened and the photodiode 182b accumulates charges onto its photodiode capacitance, without transferring same to the readout capacitance 184. The complementary situation 222 results during the transfer phase 214 when the charge carriers generated are stored in the photodiode capacitance of the pinned photodiode 182a, whereas the charge carriers stored in the photodiode 182b during the accumulation cycle dissipate via the closed switch 188b onto the readout capacitance 184b.

An advantage of the modulation method is that the background light portion is corrected automatically by subtracting the two signals accumulated by the different photodiodes and that, in order to increase the signal-to-background ratio, the integration duration may simply be increased. An advantage of using a pinned photodiode for realizing a modulation method of FIG. 6 is that no opaque shielding is applied above the light-sensitive p$^+$-type regions 230a and 230b, as is the case for the CCD gate and/or the photogate mentioned in PCT/DE00/03632. Due to the fact that the p$^+$-type layer of the photodiode is completely exposed, the signal-to-noise ratio and the sensitivity are improved significantly and, in addition, the modulation method may be realized by means of a sensor which is manufactured completely in a cheap standard CMOS process.

Although an implementation of the inventive detection device is illustrated referring to FIG. 2 in the p-epi CMOS process, the realization of the pinned photodiode is also possible in the complementary technology of an n-epi CMOS process. The CDS stage 32 in FIG. 1 includes the switches Select1_a, Select1_b, the holding capacitances 40a and 40b, unity-gain amplifiers 38a and 38b and the difference-calculating stage 34 as a possible realization of a CDS stage, wherein any other realization of a CDS stage and/or calculating the difference of two analog signals is possible as well. Alternatively, the signals may also be digitalized so that calculating the difference will take place digitally.

Depleting the photodiode 120 in FIG. 4 during a complete readout cycle may, if appropriate, be accelerated by closing the switch 130c simultaneously to closing switch 130a or 130b, which is not illustrated explicitly in the wave forms in FIG. 5, but is a possible alternative.

The type of the modulation signals and cycles determining the time of charge transfer onto the readout capacitances 184a and 184b in FIG. 6 are not defined specifically. They may, like in FIG. 7, be simple square-wave signals or they may be sine-shaped or, exemplarily, be a pseudo-noise sequence or the like. More complex circuit structures, like, for example, multi-quadrant demultiplexers, and the like, may also be realized by means of the pinned photodiode. Furthermore, a distance sensor which is based on the modulation method may be realized by means of a circuit similar to that of FIG. 4, wherein the modulation signal controls the time of reading out the accumulated photocharges of a single photodiode structure 120 in two independent readout branches 128a and 128b such that a distance sensor based on the modulation method may be realized by means of only one single pinned photodiode.

Depending on the circumstances, the inventive method for detecting optical radiation may be implemented in either hardware or software. The implementation may be on a digital storage medium, in particular on a disc or CD having control signals which may be read out electronically which can cooperate with a programmable computer system such that the inventive method for detecting optical radiation will be executed. Generally, the invention thus also is in a computer program product comprising a program code stored on a machine-readable carrier for performing the inventive method when the computer program product runs on a computer. In other words, the invention may also be realized as a computer program comprising a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:
1. An optical detection device comprising:
a photodiode structure comprising a photodiode capacitance for accumulating charge carriers responsive to electromagnetic radiation;
a readout capacitance;
a resetter for resetting the readout capacitance by applying a predetermined voltage to the readout capacitance;
a switch for connecting the photodiode structure to the readout capacitance to transfer the accumulated charge carriers to the readout capacitance during a transfer phase and for separating the photodiode structure from the readout capacitance during an accumulation phase;
a readout unit for reading out the readout capacitance, the readout unit being implemented to read out the readout capacitance for a first time during the accumulation phase and for a second time after the accumulation phase for acquiring a first and second readout values and to combine the two values for acquiring a readout result; and
an additional readout capacitance comprising a respective additional resetter for resetting the additional readout capacitance, and an additional switch for connecting the photodiode capacitance to the additional readout capacitance during an additional transfer phase.

2. The device of claim 1, wherein the resetter is implemented to reset the readout capacitance at least once during a transfer phase.

3. The device of claim 1, wherein the photodiode structure generating the charge carriers includes a pinned photodiode.

4. The device of claim 1, wherein a readout result depends on the ratio of the photodiode capacitance and the readout capacitance, the quotient of the photodiode capacitance and the readout capacitance being positive.

5. The device of claim 1, wherein the readout unit is implemented to determine a state of the readout capacitance without altering same.

6. The device of claim 1, wherein the radiation to be measured is pulsed in radiation phases, and wherein the device comprises a controller for synchronizing the radiation phases with the accumulation and transfer phases.

7. The device of claim 6, wherein the controller is implemented to synchronize the accumulation phases and the transfer phases with the radiation phases such that there is at least one pair of an accumulation phase followed by a transfer phase which are synchronized with the radiation phase between a first reset of the readout capacitance and a second reset of the readout capacitance.

8. The device of claim 7, wherein the readout unit is implemented to read out, at a beginning of the accumulation phase of the first pair of accumulation phase and the transfer phase between the first and the second reset, the readout capacitance for acquiring a first readout value, and to read out, at an end of the accumulation phase of the last pair of accumulation phase and transfer phase, the readout capacitance for acquiring a second readout value, and to output a difference of the first and second readout values as a readout result.

9. The device of claim 1, further comprising:
complementary detection device of the same structure as the detection device which includes a complementary photodiode capacitance, a complementary photodiode structure, a complementary readout capacitance, a complementary resetter, a complementary switch and a complementary readout unit;
wherein the radiation to be measured is pulsed in radiation phases;
a controller which is implemented to:
synchronize the radiation phases with the resetter, the switch and the readout unit and with the complementary resetter, the complementary switch and the complementary readout unit;
during a clock cycle of a radiation phase and a phase free from radiation, connect and separate the photodiode capacitance and the readout capacitance twice and, during the clock cycle, actuate the resetter once and acquire two readout results of the readout unit;
during a clock cycle, connect and separate the complementary photodiode capacitance and the complementary readout capacitance twice and actuate the complementary resetter once and acquire two complementary readout results of the complementary readout unit.

10. A system for 3D measurements of objects, comprising:
a pulsed light source;
a plurality of optical detection device comprising: a photodiode structure comprising a photodiode capacitance for accumulating charge carriers responsive to electromagnetic radiation; a readout capacitance; a resetter for resetting the readout capacitance by applying a predetermined voltage to the readout capacitance; a switch for connecting the photodiode structure to the readout capacitance to transfer the accumulated charge carriers to the readout capacitance during a transfer phase and for separating the photodiode structure from the readout capacitance during an accumulation phase; a readout unit for reading out the readout capacitance, the readout unit being implemented to read out the readout capacitance for a first time during the accumulation phase and for a second time after the accumulation phase for acquiring a first and second readout values and to combine the two values for acquiring a readout result; and an additional readout capacitance comprising a respective additional resetter for resetting the additional readout capacitance, and an additional switch for connecting the photodiode capacitance to the additional readout capacitance during an additional transfer phase, the detection units of which are arranged in a matrix, wherein the accumulation phase and the transfer phase are synchronized with a radiation phase by means of the switch;
an imager for imaging an object onto the matrix; and
an evaluator for generating 3D information concerning the object based on the states of the readout capacitances of the plurality of devices.

11. A method for operating an optical detection device including a photodiode structure comprising a photodiode capacitance for accumulating charge carriers responsive to electromagnetic radiation and a readout capacitance, and an additional readout capacitance, comprising:
resetting the readout capacitance by applying a predetermined voltage to the readout capacitance by means of a resetter;
connecting the photodiode structure to the readout capacitance by a switch to transfer the accumulated charge carriers to the readout capacitance during a transfer phase and separate the photodiode structure from the readout capacitance during an accumulation phase;
reading out the readout capacitance by a readout unit, the readout unit being implemented to read out the readout capacitance for a first time during the accumulation phase and for a second time after the accumulation phase for acquiring a first and second readout values, and to combine the two values for acquiring a readout result;
resetting the additional capacitance;
connecting the photodiode structure to the additional readout capacitance by an additional switch to transfer the second accumulated charge carriers to the additional readout capacitance during a transfer phase and separate the photodiode structure from the additional readout capacitance during an accumulation phase; and
reading out the additional readout capacitance to read out the additional readout capacitance for a first time during the accumulation phase and for a second time after the accumulation phase for acquiring a first and second readout values, and to combine the two value for acquiring an additional readout result.

12. A non-transitory, computer readable medium storing a computer program, when run on a computer, the computer program performs a method for operating an optical detection device including a photodiode structure comprising a photodiode capacitance for accumulating charge carriers responsive to electromagnetic radiation and a readout capacitance, and an additional readout capacitance, the method of the computer program stored on the non-transitory, computer readable medium comprising: resetting the readout capacitance by applying a predetermined voltage to the readout capacitance by means of a resetter; connecting the photodiode structure to the readout capacitance by a switch to transfer the accumulated charge carriers to the readout capacitance during a transfer phase and separate the photodiode structure from the readout capacitance during an accumulation phase; reading out the readout capacitance by a readout unit, the readout unit being implemented to read out the readout capacitance for a first time during the accumulation phase and for a second time after the accumulation phase for acquiring a first and second readout values, and to combine the two values for acquiring a readout result; resetting the additional capacitance; connecting the photodiode structure to the additional readout capacitance by an additional switch to transfer the second accumulated charge carriers to the additional readout capacitance during a transfer phase and separate the photodiode structure from the additional readout capacitance during an accumulation phase; and reading out the additional readout capacitance to read out the additional readout capacitance for a first time during the accumulation phase and for a second time after the accumulation phase for acquiring a first and second readout values, and to combine the two value for acquiring an additional readout result.

* * * * *